(12) United States Patent
Zimmermann et al.

(10) Patent No.: US 7,065,007 B2
(45) Date of Patent: Jun. 20, 2006

(54) METHOD AND A PLAYBACK DEVICE FOR PERFORMING A TRACK SLIP

(75) Inventors: Holger Zimmermann, Hildesheim (DE); Volker Becker, Hildesheim (DE); Jens Maier, Giesen (DE); Dieter Baas, Auehneim (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 09/937,006

(22) PCT Filed: Jan. 18, 2001

(86) PCT No.: PCT/DE01/00199

§ 371 (c)(1),
(2), (4) Date: May 29, 2002

(87) PCT Pub. No.: WO01/54120

PCT Pub. Date: Jul. 26, 2001

(65) Prior Publication Data

US 2004/0081034 A1 Apr. 29, 2004

(30) Foreign Application Priority Data

Jan. 21, 2000 (DE) ............................... 100 02 443

(51) Int. Cl.
*G11B 21/08* (2006.01)
(52) U.S. Cl. .................................. 369/30.12
(58) Field of Classification Search ............ 369/30.12, 369/30.11, 30.1, 30.13, 30.14, 30.15, 44.28, 369/44.27, 44.29; 720/659, 670
See application file for complete search history.

(56) References Cited

U.S. PATENT DOCUMENTS

| | | | | |
|---|---|---|---|---|
| 4,759,006 A * | 7/1988 | Koishi et al. | ............ | 369/44.28 |
| 4,845,698 A * | 7/1989 | Baas | ........................ | 369/30.15 |
| 4,847,708 A * | 7/1989 | Furuyama | ................. | 369/30.12 |
| 4,855,979 A * | 8/1989 | Kimura et al. | ........... | 369/30.04 |
| 5,173,887 A * | 12/1992 | Aoyagi et al. | ............. | 369/30.1 |
| 5,175,716 A * | 12/1992 | Min | ........................ | 369/44.11 |
| 5,457,669 A * | 10/1995 | Kim et al. | ................ | 369/30.15 |
| 5,661,705 A * | 8/1997 | Kunikata et al. | ......... | 369/30.15 |
| 5,737,284 A * | 4/1998 | Yamada | ...................... | 369/30.1 |
| 5,808,982 A * | 9/1998 | Yun | ........................ | 369/30.15 |
| 5,956,299 A * | 9/1999 | Aoki | ........................ | 369/30.15 |
| 6,011,760 A * | 1/2000 | Fleming, III | ............... | 369/30.1 |
| 6,385,144 B1 * | 5/2002 | Kuriuzawa et al. | ...... | 369/30.12 |
| 6,738,320 B1 * | 5/2004 | Kadlec et al. | ........... | 369/30.17 |
| 6,781,929 B1 * | 8/2004 | Kadlec | ..................... | 369/44.28 |
| 6,928,037 B1 * | 8/2005 | Maier et al. | ............... | 369/30.1 |

* cited by examiner

*Primary Examiner*—Tan Dinh
(74) *Attorney, Agent, or Firm*—Kenyon & Kenyon LLP

(57) ABSTRACT

A method for performing a track skip and a playback device for optical storage disks enable an accelerated track skip in the case of a non-moving storage disk in which a time is determined for the track skip of a read device between a current track and a selected track of a storage disk inserted in the playback device, as a function of the tracks to be skipped in this instance, and the read device is moved in the direction of the selected track for the determined time. In response to a track skip request, the read device is moved in the direction of a lead-in area of the optical storage disk until a starting position is detected. The time necessary for the track skip from starting position to the selected track is determined from this track.

5 Claims, 2 Drawing Sheets

METHOD AND A PLAYBACK DEVICE FOR PERFORMING A TRACK SLIP

FIELD OF THE INVENTION

The present invention relates to a method for performing a track skip operation.

BACKGROUND INFORMATION

A control system for a read device of a disk player is discussed in British Patent Application No. 2 228 132. In this context, the position data representing the present position of a read device are read from a disk. The distance of the present position to the starting position of the read device is calculated according to the read position data. The read device is moved to the starting position in accordance with the calculated distance. For this purpose, the time necessary for moving the read device, for triggering a transport motor for the read device is determined from the calculated distance. Subsequently, the read device is moved for the calculated time.

SUMMARY OF THE INVENTION

The exemplary method according to the present invention and the exemplary playback device according to the present invention are believed to have the advantage that no position data must be read out from the storage disk for a track skip, so that it is also possible to skip a track in a state in which the storage disk is not being moved and no position data can be read out. This can be the starting state, for example. In this manner, the result is a quicker access time to the selected track from the non-moving state, e.g. when starting the storage disk. Since no position data needs to be read from the storage disk for a track skip, it is not necessary for the entire track skipping operation to move the storage disk or to set it in rotation. In this manner, energy may be saved. The time necessary for accelerating the storage disk to a rotational speed at which the position data could be read out from the storage disk may also be saved.

It is also believed to be advantageous that the determined time is multiplied by an adjustable correction factor, and that the read device is moved in the direction of the selected track for the time correction in this manner. Changes in the ease of movement of the read device can be compensated for in this manner in that the correction factor is adjusted to the changes in the ease of movement of the read device.

A further advantage is believed to be that, after completion of the track skip, position data read out by the read device are compared to position data known for the selected track, and that the correction factor is adjusted as a function of a difference between the read-out and the known position data. In this manner, the correction factor is automatically adapted to the ease of movement of the read device. The resulting self-learning effect results in the track skips of the read device being carried out with increasing accuracy over time, thereby causing an automatic optimization of the skip times of the read device calculated for the track skips.

DETAILED DESCRIPTION

Figure 1:
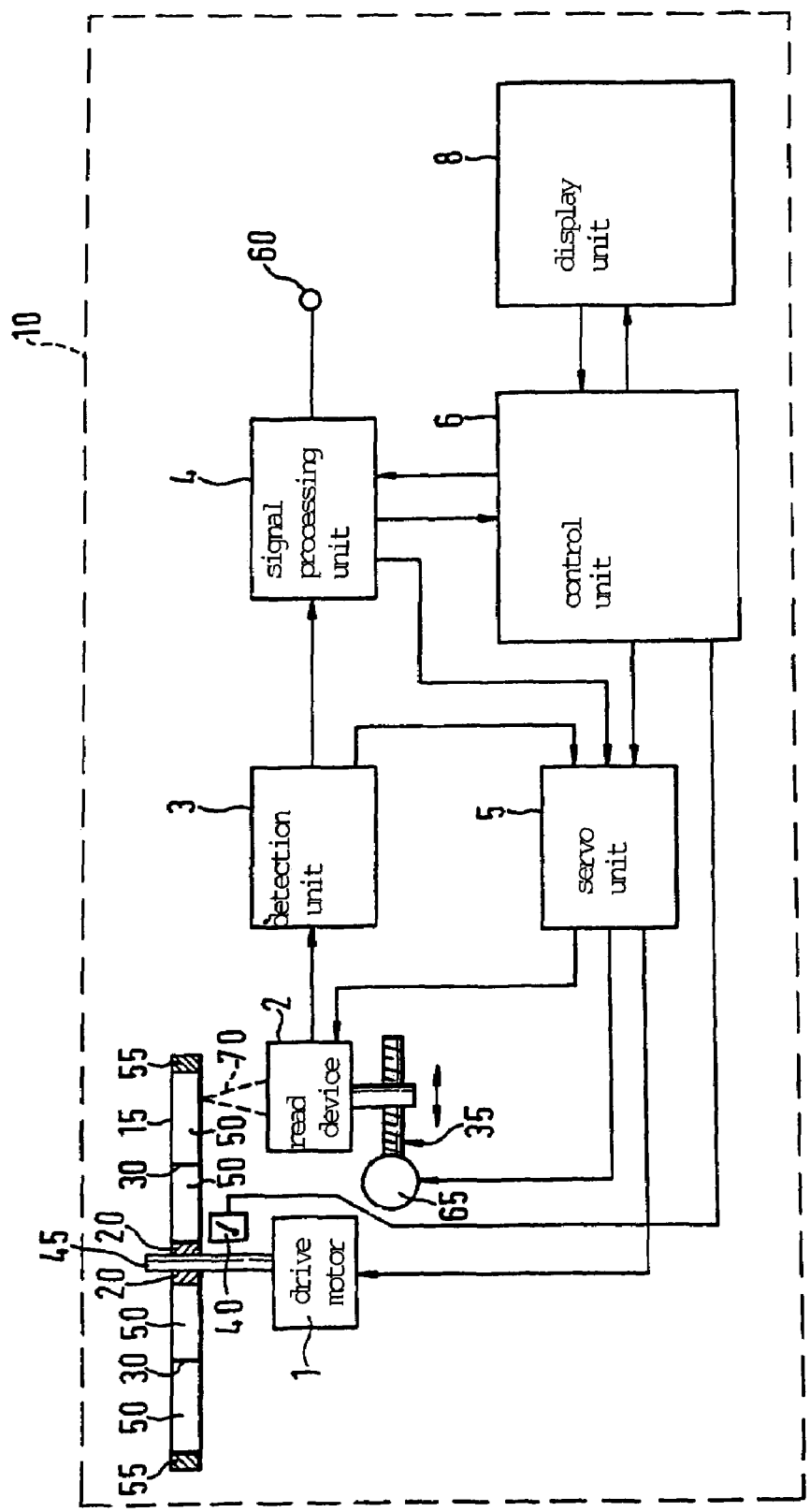
FIG. 1 shows a block diagram of an exemplary playback device according to the present invention.

In FIG. 1, 10 designates a playback device for optical storage disks, configured as a compact disk player, for example. Playback device 10 includes a drive motor 1 for driving an optical storage disk 14 inserted in playback device 10 and configured as a compact disk, for example, in a rotary manner via a shaft 45. In accordance with a double arrow represented in FIG. 1, a read device 2 is guided via a positioning device 35 in a radial direction, along a surface of optical storage disk 15. Read device 2 is connected via a detection unit 3 and a signal-processing unit 4 to a control unit 6. Detection unit 3, signal processing unit 4, and control unit 6 are each connected to a servo unit 5. An input and display unit 8 is connected to control unit 6. Servo unit 5 drives drive motor 1, positioning device 35, and read device 2. Furthermore, a switch 40 is provided that is situated in the vicinity of a starting position 25 of a lead-in area 20 of optical storage disk 15 according to FIG. 2. Switch 40 is likewise connected to control unit 6.

Storage disk 15 includes three regions: a lead-in area 20, in which a table of contents designated as TOC is recorded, a program area 50, in which the useful data, e.g. music signals, are recorded, and an end area 55, in which a program termination signal is recorded. These three areas are situated on storage disk 15 in the described sequence, i.e., in a radial direction from shaft 45 on the inside of storage disk 15 toward the outside. This means that lead-in area 20 is the most inner region, end area 55 is the most outer region of optical storage disk 15, and program area 50 is between lead-in area 20 and end area 55. Stored in the table of contents of lead-in area 20 are, for example, the number of program data, e.g. of music titles recorded on a compact disk, the addresses or starting positions of the program data on storage disk 15, and the total playback time of all of the program data recorded on storage disk 15. In this context, the content data can be recorded repeatedly in lead-in area 20 of storage disk 15 to the starting position of program area 50. The useful data, e.g. the music data in the case of a compact disk, recorded in program area 50 include a plurality of frames. Every frame includes a synchronization signal, a subcode of control data, data bits of useful signals, e.g. music signals and error correction bits for correcting errors in the data bits. The subcodes also include address data.

Read device 2 optically reads out the data recorded on storage disk 15 and optoelectrically converts the read signals. The electrical recording signal obtained in this manner is supplied to detection unit 3. From there, the recording signal is relayed to signal processing unit 4. Detection unit 3 also delivers error signals, e.g. a focus error signal and a track error signal, to servo unit 5. In signal processing unit 4, the recording signal is converted into a digital signal in order to detect the synchronization signal, to demodulate the useful data signal, i.e., the music signal in this example, and to detect the subcode. The useful information signal or the music signal undergoes a digital-to-analog conversion, so that it can be emitted as an analog audio signal at an output 60 of signal processing unit 4. Part of the synchronization signal is transmitted by signal processing unit 4 to servo unit 5, and the subcode is relayed by signal processing unit 4 to control unit 6.

In response to the error signal from detection unit 3, to the synchronization signal of signal processing unit 4, and to control signals of control unit 6, servo unit 5 emits servo signals for a focus servomechanism, a track servomechanism, and a positioning device 35. In this context, in the case of the focus servomechanism, a focus coil of read device 2 is driven in such a manner that a light beam 70 from read device 2 is focused on a reflective surface of storage disk 15. Accordingly, in the case of the track servomechanism, a track coil of read device 2 is driven such that light beam 70 is directed at a track to be read out. Accordingly, a transport (carriage) motor 65 of positioning device 35 is driven such that read device 2 is moved in a radial direction along the surface of storage disk 15. Finally, servo unit 5 also emits servo signals for a CLV servomechanism (constant linear velocity), which linearly drives drive motor 1 at a constant speed.

Control unit 6 is configured as a microcomputer that emits the control signal for controlling the different units of playback device 10 described above.

Input/display unit 8 can also only be configured as an input unit and enables the input of an address of a data group of a storage disk 15 inserted into playback device 10. For example, this can be the initial address of a music title. In this context, the initial address of a title can be input at a numeric keypad of input/display unit 8, using the title number. When reading out the table of contents in lead-in area 20 for the first time, the content data are stored in a memory not shown in FIG. 1, the memory being assigned to control unit 6 and being integrated in it or connected to it. In this context, the memory can also be situated outside of playback device 10 and is then to be connected to playback device 10 or control unit 6 of playback device 10 via a suitable interface. By comparing the title number input at input/display unit 8 to the content data stored in the memory, control unit 6 can be used to select a desired destination address to which read device 2 or light beam 70 of read device 2 is to be moved on storage disk 15. From this destination address, a selected track 30 can be determined in control unit 6, whose position data on storage disk 15 are known in the form of the destination address and are stored in the memory via the content data.

The data of storage disk 15 are recorded in a spiral. However, due to the track width and the minimal rise of the spiral, one refers to individual tracks, so that one can imagine the data recorded in concentric rings on storage disk 15. There are two possibilities to change from track to track. On the one hand, there is positioning device 35 as a roughly adjusting unit on which read device 2 including an optical scanning unit (not shown), which generates light beam 70 for optically scanning the data recorded on storage disk 15, is located. With the aid of transport motor 65 of positioning device 35, read device 2 is moved in a radial direction across the surface of storage disk 15. A unit for fine adjustment is configured as a lens of the optical scanning unit that is suspended in a free-moving manner in a magnetic field. In this context, this lens (also not shown in the figures) can be moved in a direction perpendicular to storage disk 15 via the focus servomechanism or in accordance with the driving of the focus coil of the focus servomechanism that affects this magnetic field. Moreover, the lens of the optical scanning unit can be moved in a direction perpendicular to the tracks by accordingly driving the track coil of the track servomechanism, which also influences this magnetic field. As such, an area of approximately 600 tracks is currently covered.

If a skip from a currently scanned track on storage disk 15 to, for example, a track 30 selected at input/display unit 8 in program area 50 of storage disk 15 is demanded, the number of tracks to be skipped is calculated from the difference of the current track and selected track 30. Currently, drive motor 1 of playback devices 10 configured as a compact disk player and for reproducing music operates as a function of the position of read device 2 in the radial direction along the surface of storage disk 15 and as a function of the total playing time of storage disk 15 at a rotational speed of between approximately 3.3 rotations per second and approximately 4.5 rotations per second, for example. This rotational speed limits the controllable, translatory speed of read device 2 in the radial direction, along the surface of storage disk 15, since for counting the tracks, light beam 70 must be on the data tracks for a minimum time in order to read out the corresponding information from the data tracks. This results in an upper translatory speed limit. Furthermore, a minimum rotational speed of storage disk 15 is necessary for scanning and reading out the data tracks via light beam 70, so that there is also a lower speed limit of storage disk 15, starting from which the tracks can first be counted. This may be particularly useful when upon beginning the playback operation of storage disk 15, i.e., upon increasing the rotational speed of storage disk 15 from zero to the lower speed limit, a skip is to be made to a selected track 30. In this case, the access time to the selected track is delayed by the time until reaching the minimum speed limit. According to the exemplary embodiment and/or exemplary method of the present invention, this delay is circumvented in that a controllable displacement of read device 2 in a radial direction along the surface of storage disk 15 is described that does not require the evaluation or scanning of information recorded in the data tracks. The same difficulty also arises in pause situations in which at least drive motor 1 is inactive to reduce power loss. Also in this case, storage disk 15 must first be brought to a specific minimum rotational speed determined by the lower speed limit before the tracks can begin to be counted, thereby extending the effective access time to selected track 30.

Figure 2:
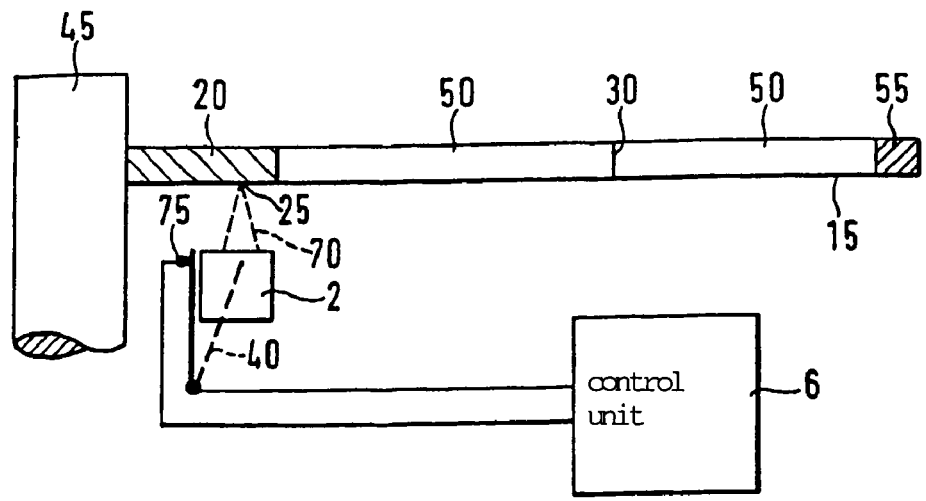
FIG. 2 shows a detail of the block diagram according to FIG. 1.

Thus, in accordance with the exemplary embodiment and/or exemplary method of the present invention, the distance to be covered from the current track to selected track 30 is calculated on the basis of the time necessary for the track skip of read device 10, and not on the basis of the number of tracks. In this context, the exemplary method proceeds as follows: In response to a user requesting a track skip, e.g. by an appropriate input at input/display unit 8, from the track currently scanned by light beam 70 to a track 30 also selected, for example, at input-display unit 8, e.g. in the form of title number information and representing, for this selected example, the initial address of the selected title or of a selected data group, read device 2 is moved by positioning device 35, which is accordingly driven by control unit 6, in the direction of lead-in area 20 of storage disk 15 until switch 40 is actuated in accordance with FIG. 2, i.e., is brought from a first switch position represented by a dotted line in FIG. 2 into a second switch position, which, according to the example in FIG. 2, is characterized in that a switching contact 75 is contacted. By closing a corresponding electric circuit, the actuation of switch 40 is detected in control unit 6. In this context, light beam 70 of read device 2 is in starting position 25 of lead-in area 20 of optical storage disk 15 according to FIG. 2, in which the same reference numerals designate the same elements as in FIG. 1. Control unit 6 determines from selected track 30 the time necessary for the track skip from starting position 25 to this selected track 30. In this context, a standard turn-on time for the movement of read device 2 via positioning device 35 is first calculated for the track skip from starting position 25 to selected track 30, the time being multiplied by a correction factor known from the previous skips if necessary. In this context, for the calculation of the standard turn-on time, a previously determined quotient of the time necessary for skipping a number of tracks and of this number of tracks is determined and is multiplied by the number of tracks to be skipped resulting from the difference between selected track 30 and starting position 25. This yields the duration of the motor drive pulse necessary for driving transport motor 65 in order to radially move read device 2 via positioning device 35 by the desired number of tracks, along the surface of storage disk 15, in the direction of selected track 30. In this context, control unit 6 supplies the corresponding motor drive pulse having the determined, required time duration to transport motor 65. By correcting the skip time determined by control unit 6 using an adjustable correction factor, changes in the ease of movement of read device 2 as well as the fact that starting position 25 can generally only be maintained approximately within lead-in area 20 can be compensated for in that the correction factor is accordingly adjusted. Positioning device 35 then moves read device 2 for the time corrected in this manner in the direction of selected track 30. In this context, the correction factor can be adjusted in that, after completion of the track skip, control unit 6 compares position data read out by read device 2 to the position data known for selected track 30, and in that control unit 6 adjusts the correction factor as a function of the difference between the read-out and the known position data. In this manner, the difference between the read-out and the known position data can be continuously reduced in further track skips, so that a self-learning effect is achieved in which the system learns over time to perform the skips with increasing accuracy. Thus, it is possible to automatically optimize the accuracy of the track skips over time via the adjustable correction factor that can be adapted to external conditions. The rotational speed of storage disk 1a5 having at least reached the lower speed limit is naturally a prerequisite for reading out the position data after completion of the track skip.

Of course, the exemplary method according to the present invention can be combined with any available methods in which track skips are performed on the basis of read-out position data of the current track, it being necessary in these methods to presuppose a rotational speed for storage disk 15 that is above the required, already described lower speed limit.

However, as a result of the exemplary method according to the present invention, the time duration of a track skip is also not affected by the described upper translatory speed limit, since no position data have to be read out for the track skip itself.

The ease of movement of read device 2 can be changed, for example, by external influences, such as temperature, wear, etc.

Figure 3:
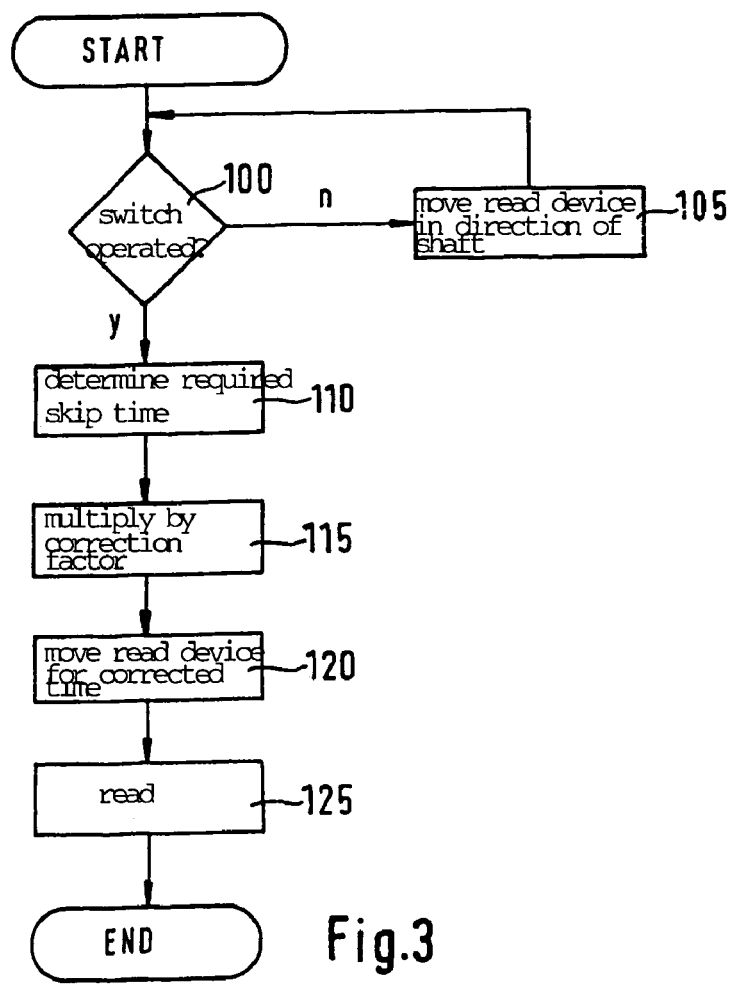
FIG. 3 shows a flow chart for a control of the exemplary playback device according to the present invention.

A flow chart for the functioning method of control unit 6 is represented in FIG. 3. At a program point 100, a check is made to determine whether switch 40 was operated. If this is the case, the program branches to program point 110, otherwise the program branches to program point 105. At program point 105, control unit 6 causes transport motor 65 of positioning device 35 to move read device 2 to the inside of storage disk 15, in the direction of shaft 45. The program subsequently branches back to program point 100. At program point 110, control unit 6 calculates the required skip time for read device 2 to reach selected track 30. At program point 115, control unit 6 multiplies the time calculated at program point 110 by the correction factor. At program point 120, via a motor drive pulse, control unit 6 causes transport motor 65 of positioning device 35 to move read device 2 in the direction of selected track 30 for the time period corrected at program point 115. At program point 125, the track skip is ended, and light beam 70 of read device 2 focuses on the track reached at the end of this track skip. Control unit 6 compares the position information read out by read device 2 from the track reached at the end of the track skip to the position data known for selected track 30 and adjusts the correction factor as a function of the difference between the read-out and the known position data such that a multiplication of the skip time determined at program point 110 and the correction factor newly adjusted at program point 125 results in a skip time in which a track skip of read device 2 from starting position 25 in the direction of selected track 30 would have resulted in light beam 70 focusing on selected track 30. After program point 125, the program segment is exited.

The correction factor current in each case and the standard turn-on time can also be stored in the memory, which can be configured as a write-read memory, for example, or in another manner.

As already described, for the readout operation from storage disk 15 presupposed in the adaptation of the correction factor at program point 125, at least one rotational speed of storage disk 15 corresponding to the lower speed limit is necessary, for which purpose control unit 6 is to accordingly drive motor 1 at program point 125 at the latest. If the rotational speed of storage disk 15 is not yet in the required speed range at program point 125, light beam 70 is to be focused on the track reached at the end of the track skip until it is possible to read out the position data of this track and, thus, to adapt the correction factor.

To not lose time above all after pause situations or when initiating playback of storage disk 15, control unit 6 should induce the increase in the rotational speed of storage disk 15 at the same time as the introduction of the track skip, so that the rotational speed of storage disk 15 is already in the speed range necessary for reading out position data at the conclusion of the track skip.

The exemplary method according to the present invention can be used for any optical storage disk 15, e.g. also for CD ROMs. The same is true for playback device 10, which is not limited to compact disk players, but can be generally configured as a playback device for optical storage disks, i.e., also as a CD ROM drive, for example.

What is claimed is:

1. A method for performing a track skip of a read device to a selected track of an optical storage disk inserted in a playback device, comprising the steps of:
   moving the read device in a direction of a lead-in area of the optical storage disk until a predefined starting position is detected, in response to a track skip request;
   determining a time required for the track skip of the read device from the starting position to the selected track, as a function of tracks to be skipped; and
   moving the read device for the determined time required for the track skip in a direction of the selected track;
   wherein the determined time is multiplied by an adjustable correction factor to obtain a corrected time, and the read device is moved in the direction of the selected track for the corrected time.

2. The method of claim 1, wherein, after completion of the track skip, position data read out by the read device are compared to known position data for the selected track, and the adjustable correction factor is adjusted as a function of a difference between the data read out and the known position data.

3. A playback device for optical storage disks, comprising:
- a positioning device;
- a read device for reading out data tracks of an optical storage disk;
- a control unit to determine a time required for a track skip of the read device via the positioning device from a predefined starting position of a lead-in area of the optical storage disk to a selected track as a function of tracks to be skipped; and
- a switch situated in a vicinity of the starting position of the lead-in area of the optical storage disk;

wherein:
in response to a track skip request, the positioning device moves the read device in a direction of the lead-in area until the switch is operated, and the positioning device moves the read device for the determined time required for the track skip in a direction of the selected track.

4. The playback device of claim 3, wherein the control unit multiplies the determined time by an adjustable correction factor to provide a corrected time, and the positioning device moves the read device in a direction of the selected track for the corrected time.

5. The playback device of claim 4, wherein, after the completion of the track skip, the control unit compares position data read out by the read device to known position data for the selected track, and the control unit adjusts the adjustable correction factor as a function of a difference between read-out position data and the known position data.

* * * * *